United States Patent
Sopp et al.

(10) Patent No.: US 7,110,840 B1
(45) Date of Patent: Sep. 19, 2006

(54) MASTER CONTROL SYSTEM FOR A ROLLING MILL

(75) Inventors: Peter Sopp, Nürnberg (DE); Siegbert Steidl, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/937,913

(22) PCT Filed: Mar. 17, 2000

(86) PCT No.: PCT/DE00/00837

§ 371 (c)(1),
(2), (4) Date: Sep. 17, 2003

(87) PCT Pub. No.: WO00/59651

PCT Pub. Date: Oct. 12, 2000

(30) Foreign Application Priority Data

Apr. 1, 1999 (DE) ................................ 199 14 987

(51) Int. Cl.
G06F 19/00 (2006.01)
G06F 11/00 (2006.01)
G06F 15/00 (2006.01)
G05B 15/00 (2006.01)
B21B 23/00 (2006.01)

(52) U.S. Cl. ..................... 700/96; 700/83; 700/148; 702/188; 72/365.2; 72/483

(58) Field of Classification Search .............. 700/96, 700/110, 116, 148, 150; 702/183–185, 188; 72/6.2, 14.6, 20.1, 21.6, 365.2, 483, 199, 72/226, 232, 236

See application file for complete search history.

(56) References Cited

U.S. PATENT DOCUMENTS

| | | | | |
|---|---|---|---|---|
| 3,568,637 A | * | 3/1971 | Smith, Jr. ............... | 72/10.4 |
| 4,037,087 A | * | 7/1977 | Foulds ................... | 700/150 |
| 4,130,883 A | * | 12/1978 | Hazelton ................ | 710/71 |
| 4,261,190 A | * | 4/1981 | Fapiano .................. | 72/8.7 |
| 4,274,273 A | * | 6/1981 | Fapiano et al. ......... | 72/8.5 |
| 4,662,202 A | * | 5/1987 | Lambert ................. | 72/8.5 |
| 4,909,055 A | * | 3/1990 | Blazevic ................ | 72/9.2 |
| 6,807,449 B1 | * | 10/2004 | Schlang et al. ......... | 700/48 |

FOREIGN PATENT DOCUMENTS

| | | | |
|---|---|---|---|
| DE | 4127531 | | 9/1992 |
| DE | 4127531 A1 | * | 9/1992 |
| JP | 07032027 A | * | 2/1995 |
| WO | WO97500215 | | 12/1997 |

OTHER PUBLICATIONS

Adams, J.L., et al., "Modernization of Great Lakes' 80-in. hot strip mill." *Iron and Steel Engineer*, U.S. Association of Iron and Steel Engineers, Pittsburgh, Bd. 70, No. 12, Dec. 1, 1993, pp. 27-35, XP000425809 ISSN: 021-1559, Abbildung 6.

"Logidyn D. Modulares Regel-, Steuer- und Rechensystem hoher Leistung" by Dr. Burkhard Christmann, AEG Cegelec AEG Anlagen und Antriebssyteme GmbH, pp. 3-27.

"Modemisierung der sechsgerustigen Kaitwatz- Tandemstgrasse bel Rasselstein bel einem Stillstand von nur 17 Tagen" by Manbfred Warneck, Verlog Shahleisen GmbH, (1999) pp. 1-6.

"Modernization of Rasselstein's 6-stand Tandem Mill with a Downtime of Just 17 Dyas" by Manfred Warnecke; Verlog Stahleisen GmbH, vol. 2, No. 6, 1998 pp. 1-4.

* cited by examiner

Primary Examiner—Crystal J. Barnes
(74) Attorney, Agent, or Firm—Baker Botts L.L.P.

(57) ABSTRACT

A master control system for a rolling mill, especially a mill train, having at least one rolling stand driven by means of a drive system, and the master control system having an automation device for the open-loop and/or closed-loop control of the rolling stand. The master control system also has a commissioning computer for the commissioning of the drive system and of the automation device.

12 Claims, 1 Drawing Sheet

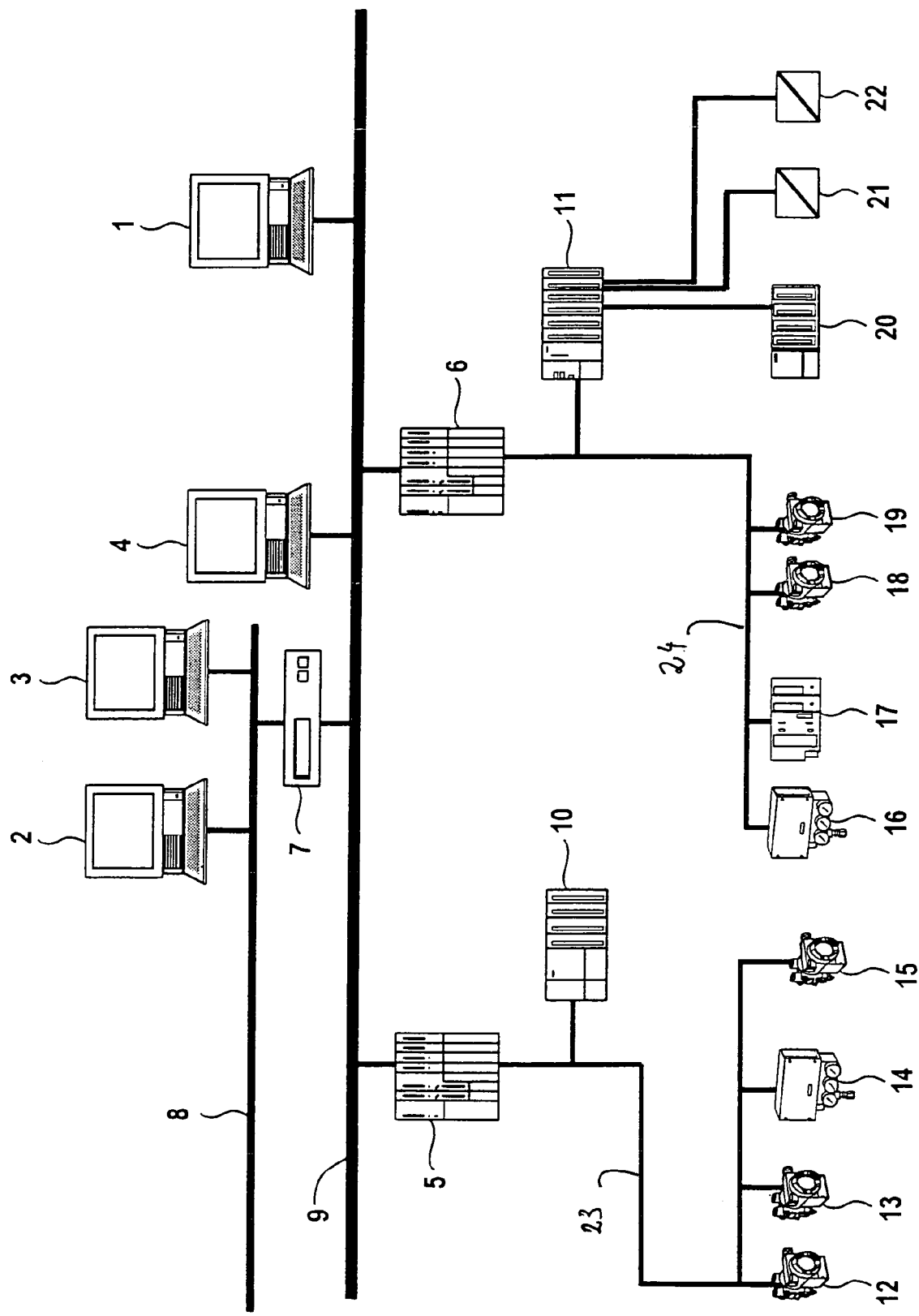

MASTER CONTROL SYSTEM FOR A ROLLING MILL

FIELD OF THE INVENTION

The invention relates to a master control system for a rolling mill, and particularly a mill train, both of which have at least one rolling stand driven by means of a drive system, and the master control system having an automation device for the open-loop and/or closed-loop control of the rolling stand. The invention also relates to a method of operating a rolling mill, on a mill train, having the aforesaid master control system.

BACKGROUND OF THE INVENTION

It is customary in the commissioning of individual components of a rolling mill or a mill train to connect said components by a data link to a commissioning computer and to commission them by transferring a program code or operating parameters. After completion of this process, this operation is repeated with the next system component. System components in this sense may be, for example, drive systems or automation devices. When individual components, for example defective components, are exchanged, the new component, for example a new automation device or a new drive system, is also correspondingly commissioned.

SUMMARY OF THE INVENTION

The object of the present invention is to improve the commissioning process. This object is achieved according to the present invention by a rolling mill which has at least one rolling stand driven by means of a drive system and a master control system with at least one automation device for the open-loop and/or closed-loop control of the rolling stand. The master control system has a commissioning computer for the commissioning of the drive system and of the automation device. According to the method of the present invention, the commissioning of the drive system and of the automation device takes place by means of the commissioning computer. The master control system has at least one bus system for the transmission of operating parameters and/or program code from the commissioning computer to at least one of the components comprising the drive system and automation device. Furthermore, the bus system is designed for the transmission of information necessary for the operation of the rolling mill, and especially the mill train, between the drive system and the automation device.

In a preferred embodiment of the present invention, the master control system has an operator-control computer for monitoring and/or influencing the rolling mill, or the mill train, and the commissioning computer is designed for the commissioning of the operator-control computer.

In a further preferred embodiment of the present invention, the bus system is designed for the transmission of operating parameters and/or program code from the commissioning computer to the operator-control computer.

In yet another preferred embodiment of the present invention, the bus system is designed for the transmission of information necessary for the operation of the rolling mill, or the mill train, between the operator-control computer and at least one of the components comprising the drive system and the automation device.

Other preferred embodiments of the present invention, include a master control system having at least one first bus system for the transmission of operating parameters and/or program code from the commissioning computer to the automation device with the commissioning computer and the automation device being connected by a data link; and at least one second bus system for the transmission of operating parameters and/or program code to the drive system, with the automation device and the drive system being connected by a data link. The second bus system may also be designed for the transmission of information necessary for the operation of the rolling mill, or mill train, between the automation device and the drive system.

It is also preferred if the master control system has an operator-control computer for monitoring and/or influencing the rolling mill, or mill train, with the operator-control computer being connected to the first bus system by a data link, and the first bus system being designed for the transmission of information necessary for the operation of the rolling mill, or mill train, between the operator-control computer and the automation device.

In yet another preferred embodiment of the invention, the master control system has at least two different types of automation devices and the commissioning computer is designed for the commissioning of both automation devices.

BRIEF DESCRIPTION OF THE INVENTION

Further advantages and details of the present invention will be apparent from the following description of an exemplary embodiment as shown in FIG. 1 which shows a master control system.

DETAILED DESCRIPTION OF THE INVENTION

In FIG. 1, an industrial Ethernet bus 9 is shown, which connects two identically or differently designed automation devices 5 and 6, an operator-control computer 4 and a commissioning computer 1 to one another by a data link. The industrial Ethernet bus 9 is connected to a standard Ethernet bus 8 via a computer 7. Connected to the standard Ethernet bus 8 are an operator-control computer 2 and a central operator-control computer 3. Parts of the rolling mill (or parts of the mill train) can be operated via the operator-control computers 2 and 4. The interaction of individual system parts of the rolling mill (or mill train) can be operated by means of the central operator-control computer 3. Various actuators or sensors 12, 13, 14, 15 are connected by a data link to the automation device 5 via a bus system 23, which is designed as a Profibus. Furthermore, decentralized peripherals 10 are connected to the automation device 5 via the bus system 23. Various actuators or sensors 16, 17, 18, 19 are connected by a data link to the automation device 6 via a bus system 24, which is designed as a Profibus. Furthermore, decentralized peripherals 11 are connected to the automation device 6 via the bus system 24. Moreover, various actuators and sensors 20, 21, 22 can be activated and evaluated via the decentralized peripherals 11 and the automation device 6.

The operator-control computers 2, 3, 4, the automation devices 5, 6, the decentralized peripherals 10, 11, the actuators and sensors 12, 13, 14, 15, 16, 17, 18, 19, 20, 21, 22 and the bus systems 8, 9, 23, 24 serve for the operation of the rolling mill (or mill train). Furthermore, information necessary for the commissioning, such as operating parameters or program codes, i.e., software, are transmitted from the commissioning computer 1 to the automation devices 5, 6, the decentralized peripherals 10 and 11 and to the actuators and sensors 12, 13, 14, 15, 16, 17, 18, 19, 20, 21, 22, and, if appropriate, to the operator-control computers 2, 3, 4. The transmission of the commissioning information takes place via the corresponding bus systems 8, 9, 23 and 24. Furthermore, the commissioning computer 1 may also be used for the development of the master control system.

It is advantageous to provide diagnostic information on the operating capability of the automation devices 5, 6 of the decentralized peripherals 10, 11, of the actuators and sensors 12, 13, 14, 15, 16, 17, 18, 19, 20, 21, 22, and, if appropriate, of the operator-control computers 2 and 4 some or all of which are transmitted to the operator-control computers 2, 3 and 4. The sensors and actuators 12, 13, 14, 15, 16, 17, 18, 19, 20, 21, 22 serve, by way of example, the open-loop and closed-loop control of one or more of the following: drive systems for rolling stands, cooling sections, coilers or loop lifters.

What is claimed is:

1. A master control system for a rolling mill, comprising at least one rolling stand, driven by a drive system, an automation device for the open-loop and/or closed-loop control of the rolling stand, and a commissioning computer, wherein the commissioning computer is designed for the commissioning of the drive system and of the automation device, and further comprising at least one bus system for the transmission of operating parameters and/or program code from the commissioning computer to at least one component comprising the drive system and the automation device, and further wherein the bus system is designed for the transmission of information necessary for the operation of the rolling mill between the drive system and the automation device, said control system further comprising an operator-control computer for monitoring and/or influencing the rolling mill, and wherein the commissioning computer is designed for the commissioning of the operator-control computer and further wherein the bus system is designed for the transmission of operating parameters and/or program code from the commissioning computer to the operator-control computer, wherein the master control system further comprises a decentralized peripheral connected to the automation device via the bus system between the drive system and the automation device.

2. The master control system according to claim 1, wherein the bus system is designed for the transmission of information necessary for the operation of the rolling mill between the operator-control computer and at least one of the components comprising the drive system and the automation device.

3. The master control system according to claim 1, further comprising at least one first bus system for the transmission of operating parameters and/or program code from the commissioning computer to the automation device, so that the commissioning computer and the automation device are connected by a data link, and at least one second bus system for the transmission of operating parameters and/or program code from the automation device to the drive system, so that the automation device and the drive system are connected by a data link.

4. The master control system according to claim 3, wherein a second bus system is designed for the transmission of information necessary for the operation of the rolling mill, between the automation device and the drive system.

5. The master control system according to claim 3 wherein the operator-control computer for monitoring and/or influencing the rolling mill, is connected to the first bus system by a data link, and the first bus system is designed for the transmission of information necessary for the operation of the rolling mill between the operator-control computer and the automation device.

6. The master control system according to claim 1, further comprising at least two automation devices of different types and wherein the commissioning computer is designed for the commissioning of both automation devices.

7. The master control system according to claim 1, wherein the rolling mill is a mill train.

8. The master control system according to claim 1, wherein the operator-control computer comprises a central operator-control computer and a decentralized operator-control computer, and wherein the central and decentralized operator-control computers are connected to a standard ethernet bus, wherein the standard ethernet bus is connected via a computer to the at least one bus system for the transmission of operating parameters and/or program code from the commissioning computer to the at least one component comprising the drive system and the automation device.

9. A rolling mill comprising at least one rolling stand driven by a drive system, and a master control system with an automation device for the open-loop and/or closed-loop control of the rolling stand, and a commissioning computer, wherein the commissioning computer is designed for the commissioning of the drive system and of the automation device, further comprising at least one bus system for the transmission of operating parameters and/or program code from the commissioning computer to at least one component comprising the drive system and the automation device, and wherein the bus system is designed for the transmission of information necessary for the operation of the rolling mill, between the drive system and the automation device, said control system further comprising an operator-control computer for monitoring and/or influencing the rolling mill, and wherein the commissioning computer is designed for the commissioning of the operator-control computer and further wherein the bus system is designed for the transmission of operating parameters and/or program code from the commissioning computer to the operator-control computer, wherein the rolling mill further comprises a decentralized peripheral connected to the automation device via the bus system between the drive system and the automation device.

10. A rolling mill according to claim 9, wherein said mill is a mill train.

11. A method of operating a rolling mill, comprising utilizing a master control system comprising a rolling mill, having at least one rolling stand driven by a drive system, an automation device for the open-loop and/or closed-loop control of the rolling stand, and a commissioning computer, wherein the commissioning of the drive system and of the automation device takes place by means of the same commissioning computer, and further comprising a bus system for the transmission (i) of operating parameters and/or program code from the commissioning computer to at least one of the components comprising the drive system and the automation device, and (ii) of information necessary for the operation of the rolling mill, between the drive system and the automation device, said control system further comprising an operator-control computer for monitoring and/or influencing the rolling mill, and wherein the commissioning computer is designed for the commissioning of the operator-control computer and further wherein the bus system is designed for the transmission of operating parameters and/or program code from the commissioning computer to the operator-control computer, wherein the method further comprises connecting a decentralized peripheral to the automation device via the bus system for the transmission of information between the drive system and the automation device.

12. A method according to claim 11, wherein the rolling mill is a mill train.

* * * * *